(12) United States Patent
Oishi et al.

(10) Patent No.: US 7,270,361 B2
(45) Date of Patent: Sep. 18, 2007

(54) VEHICLE SEAT

(75) Inventors: Tamotsu Oishi, Haga-gun (JP); Kiyoshi Yajima, Sagamihara (JP)

(73) Assignee: Honda Motor Co., Ltd., Tokyo (JP)

( * ) Notice: Subject to any disclaimer, the term of this patent is extended or adjusted under 35 U.S.C. 154(b) by 54 days.

(21) Appl. No.: 11/191,764

(22) Filed: Jul. 28, 2005

(65) Prior Publication Data

US 2006/0028044 A1    Feb. 9, 2006

(30) Foreign Application Priority Data

Aug. 6, 2004    (JP)    ............... 2004-230504

(51) Int. Cl.
*B60N 2/02*    (2006.01)
(52) U.S. Cl. ............... 296/65.03; 297/15; 297/378.1
(58) Field of Classification Search ............... 297/15, 297/378.1, 378.13, 378.11, 378.12; 296/65.03, 296/65.05, 65.09
See application file for complete search history.

(56) References Cited

U.S. PATENT DOCUMENTS 5,800,017 A * 9/1998 Sylvain et al. ............... 297/367

2007/0013204 A1 * 1/2007 Yajima et al. ............ 296/65.03

FOREIGN PATENT DOCUMENTS

JP    10-181392    7/1998

* cited by examiner

*Primary Examiner*—Lori L. Lyjak
(74) *Attorney, Agent, or Firm*—Rankin, Hill, Porter & Clark LLP

(57) ABSTRACT

A vehicle seat includes a seat base with two seat legs detachably mounted on a vehicle floor, a seat cushion provided on the seat base, a backrest rotatably supported on the seat base via a backrest support member, a first operation element for releasing a fixation of the seat legs in the rotating direction, and a second operation element for releasing a fixation of the seat base to the vehicle floor. The seat legs are rotatably provided under the seat base. The first operation element and the second operation element are provided at the backrest support member.

2 Claims, 15 Drawing Sheets

VEHICLE SEAT

Priority is claimed on Japanese Patent Application No. 2004-230504, filed Aug. 6, 2004, the contents of which are incorporated herein by reference.

BACKGROUND OF THE INVENTION

1. Field of the Invention

The present invention relates to a vehicle seat which can be removed from a vehicle floor when not in use.

2. Description of Related Art

There is a technique in which a seat can be detachably mounted at a plurality of positions on a vehicle floor such that the position of the seat is altered in accordance with service conditions (for example, refer to Japanese Patent No. 3356970).

With such a structure that allows a seat to be detachably mounted on a vehicle floor, a new space can be secured in a vehicle cabin by removing the seat. However, in the above technique, an additional apparatus such as a locking mechanism is required in order to avoid an unintentional detachment of the seat when in use, and this causes a problem in that the complexity of the structure increases.

SUMMARY OF THE INVENTION

The present invention was made in view of the above circumstances and the object thereof is to provide a vehicle seat having a simple structure which is removable from a vehicle floor when not in use and disables an unintentional detachment or the like when the vehicle seat is in use.

In order to achieve the above-mentioned object, the present invention provides a vehicle seat including a seat base with two seat legs detachably mounted on a vehicle floor, a seat cushion provided on the seat base, a backrest rotatably supported on the seat base via a backrest support member, a first operation element for releasing a fixation of the seat legs in the rotating direction, and a second operation element for releasing a fixation of the seat base to the vehicle floor. The seat legs are rotatably provided under the seat base. The first operation element and the second operation element are provided at the backrest support member.

According to the vehicle seat, when an occupant is sitting in the vehicle seat, the operations of the first operation element and the second operation element are not permitted. Thus, inconvenience due to the seat leg being unwillingly rotated can be prevented. Furthermore, this can be achieved by a simple configuration without providing an additional locking mechanism.

When the vehicle seat is removed from the vehicle floor, by rotating the backrest and by rotating the seat leg provided under the seat base, the thickness of the vehicle seat becomes thinner by an amount corresponding to the thickness of the seat leg. Thus, the removed vehicle seat can be further efficiently accommodated in the vehicle.

The first operation element and the second operation element may be disposed within a storage area in the backrest support member.

In this case, when an occupant is sitting in the vehicle seat, undesirable operation of the first operation element and the second operation element can reliably be prevented. Therefore, the reliability at preventing misoperation can be increased.

In order to achieve the above-mentioned object, the present invention provides another vehicle seat including a seat base with two seat legs detachably mounted on a vehicle floor, a seat cushion provided on the seat base, a backrest rotatably supported on the seat base via a backrest support member, and a locking element provided on the vehicle floor between two lateral seats each provided along the vehicle width direction. One of the lateral seats is slidably fixed to the locking element such that it slides along the vehicle width direction, and the vehicle seat is detachably mounted between the two lateral seats by the seat legs detachably engaged with the locking element.

DETAILED DESCRIPTION OF THE INVENTION

Preferred embodiments of the present invention will be explained below with reference to the figures. In the following explanations, front, back, left, and right directions correspond to front, back, left, and right directions with respect to the forward traveling direction of a vehicle.

First Embodiment

A first embodiment of the present invention will now be described with reference to FIGS. 1 to 14.

Figure 1:
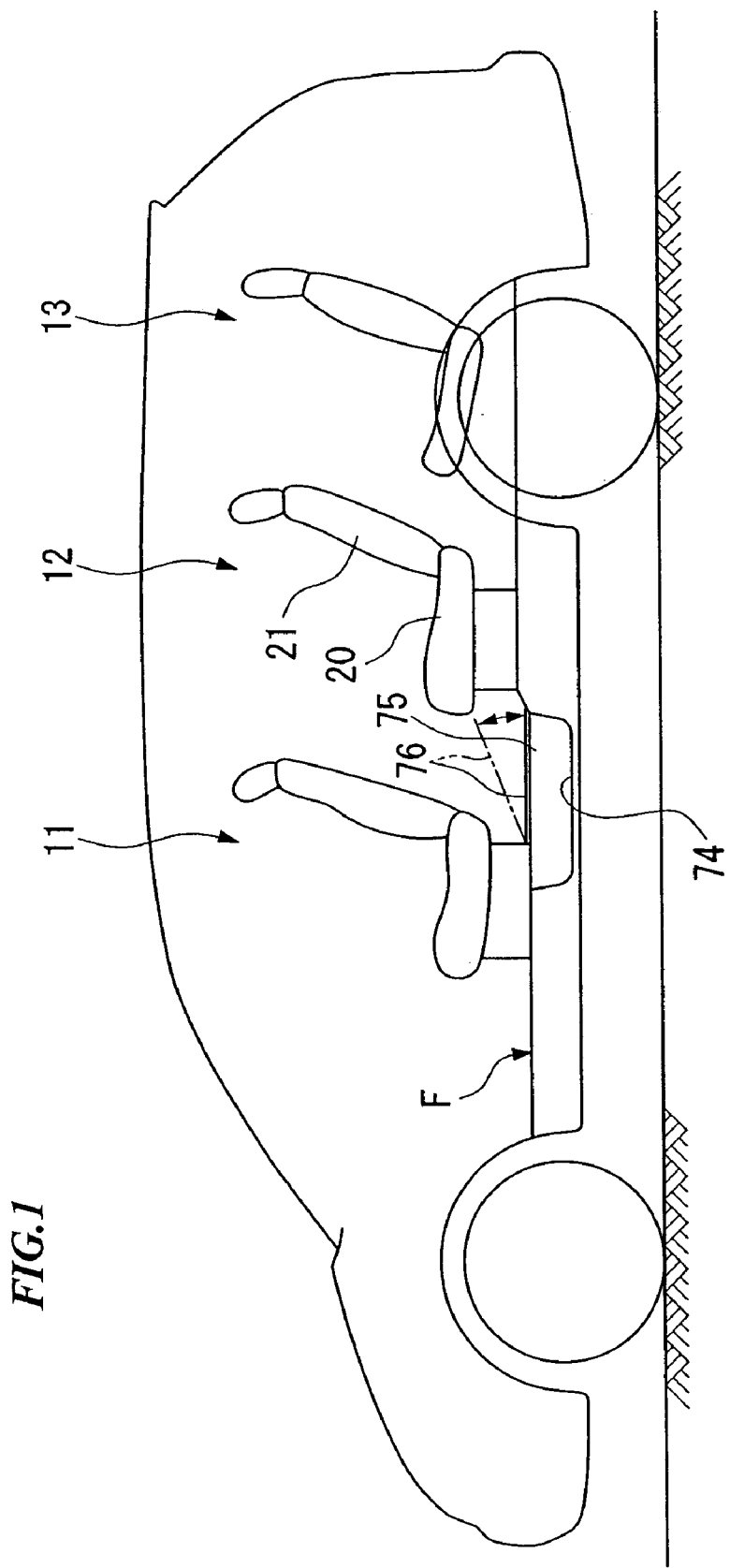
FIG. 1 is a schematic side view of a vehicle to which a first embodiment of the present invention is applied.

FIG. 1 shows an example of a vehicle to which the first embodiment of the present invention has been applied, the vehicle being a two-box type vehicle and including three rows of seats arranged one behind another.

Figure 2:
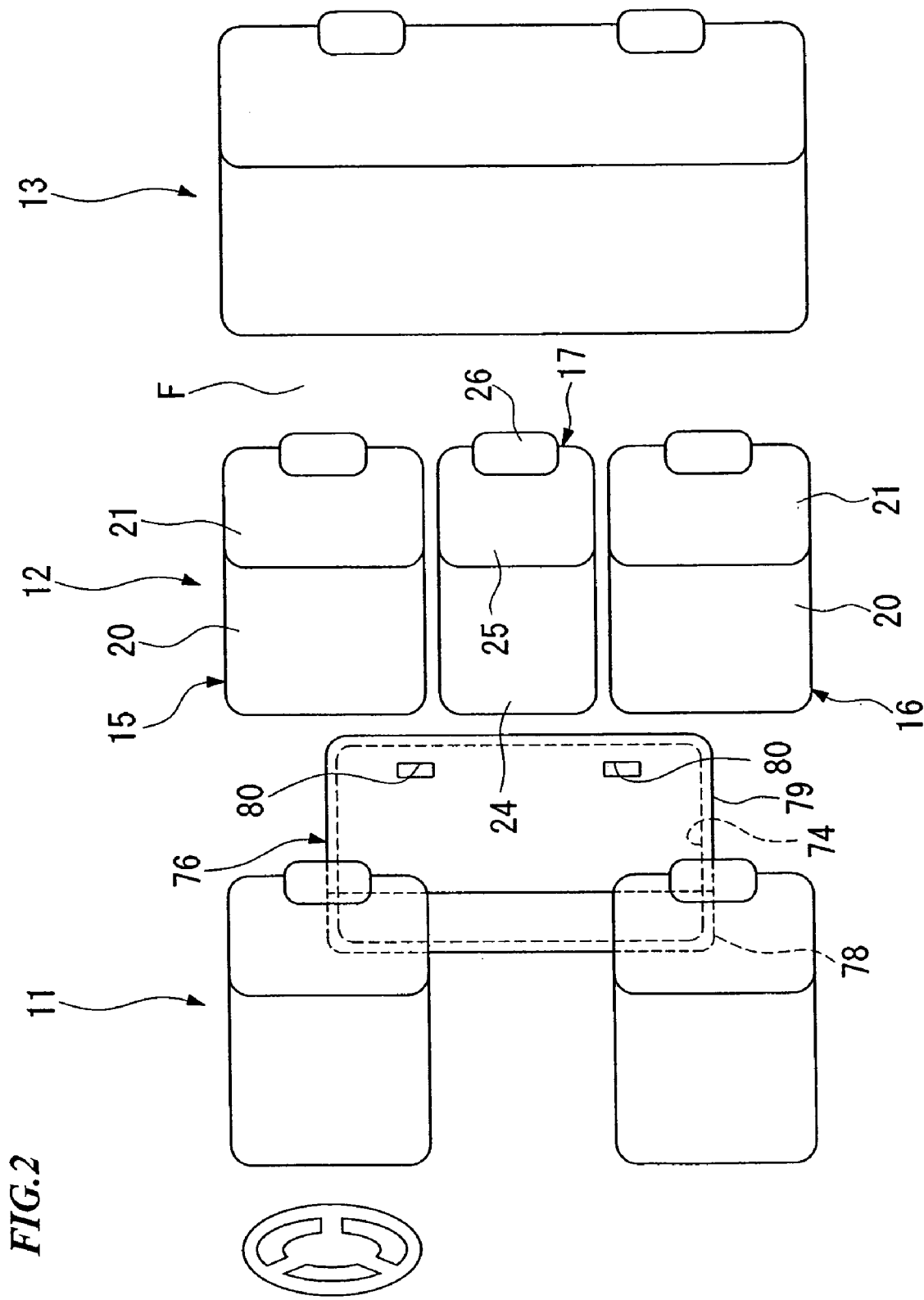
FIG. 2 is a plan view of a vehicle interior.
Figure 3:
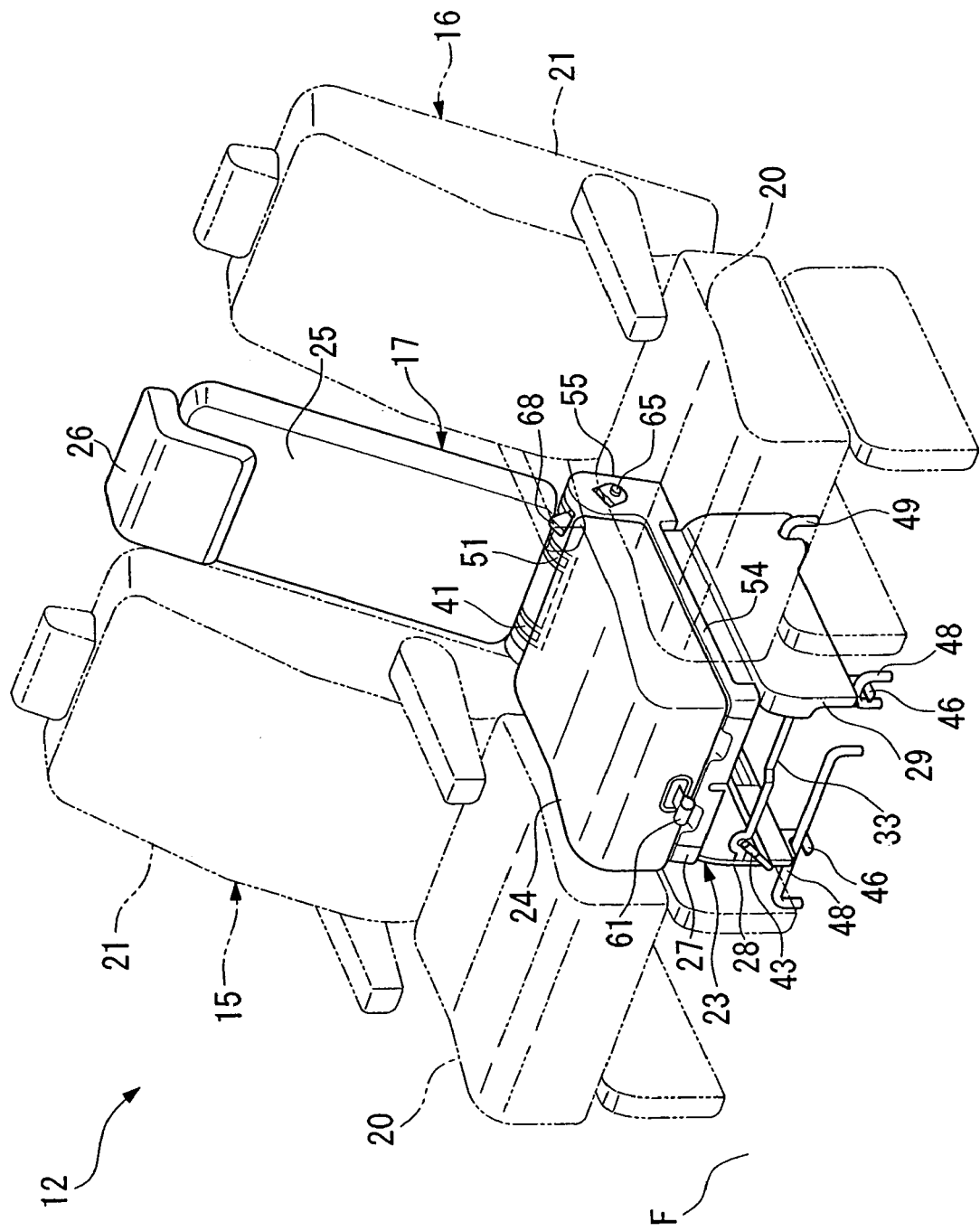
FIG. 3 is a perspective view of a second row of seats including a central seat to which the first embodiment of the present invention is applied.

As shown in FIGS. 1 and 2, the vehicle has a vehicle floor F, and a first row of seats 11, a second row of seats 12, and a third seat 13, disposed in the front, middle, and back of the vehicle floor F, respectively. The present embodiment is applied to the second row of seats 12 of the vehicle, and more specifically, to a central vehicle seat 17 in the second row of seats 12, located between a right-side lateral seat 15 and a left-side lateral seat 16, as shown in FIGS. 2 and 3. The present embodiment, however, is not limited in its application to the central seat 17 of the second row of seats 12 and is of course applicable to any other seats. The third seat 13 is a so-called bench seat.

Each of the lateral seats 15 and 16 has a seat cushion 20 that primarily supports the buttocks of an occupant and a seat back 21 positioned upright at a rear end side of the seat cushion 20 to primarily support the back of the occupant. The seat back 21 is supported on the seat cushion 20 such that the seat back 21 is rockable around an axis extending in a left and right direction. Therefore, its so-called reclining angle is adjustable. In addition, each of the lateral seats 15 and 16 is slidable forwards and backwards relative to the vehicle floor F.

Figure 4:
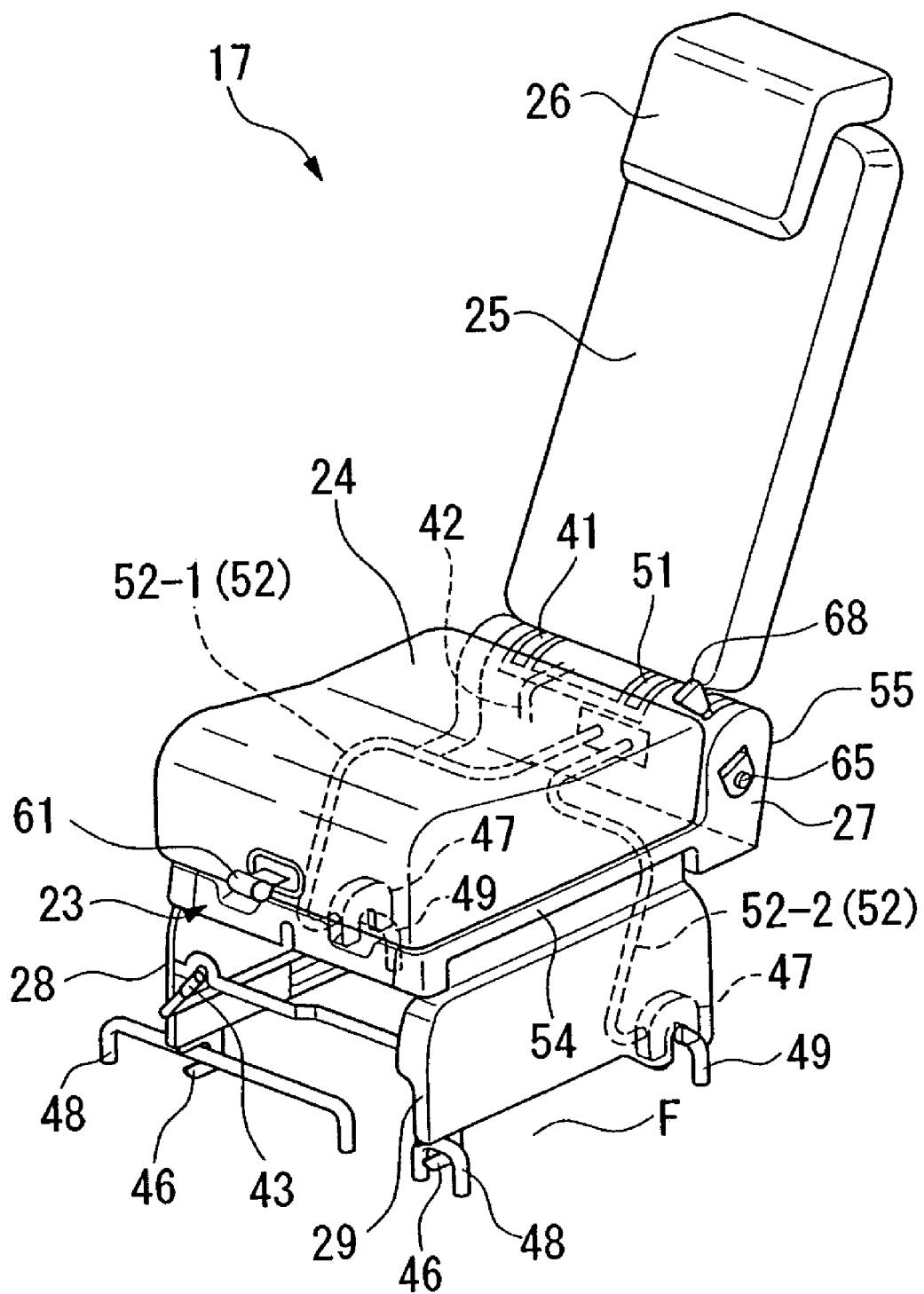
FIG. 4 is a perspective view of the central seat.

The central seat 17 has a smaller width than the lateral seats 15 and 16 and is detachably mounted on the vehicle floor F. The central seat 17, as also shown in FIG. 4, has a lower-part-constituting seat base 23, a seat cushion 24 supported on the seat base 23 to primarily support the buttocks of an occupant, and a backrest 25 including a headrest 26, supported on the seat base 23 to primarily support the back of the occupant.

The seat base 23 includes a seat base body 27 that supports the seat cushion 24 and the backrest 25, and a pair of left and right seat legs 28 and 29 provided so as to extend downwards from both left and right sides of the seat base body 27. The seat base 23 is mounted on the seat legs 28 and 29 on the vehicle floor F. The seat legs 28 and 29 are detachably mountable on the vehicle floor F and can be tilted by rotating them with respect to the seat base body 27. In other words, the seat legs 28 and 29 are rotatable between the normal position as shown in FIGS. 4 and 5 in which they extend vertically and downwards from the seat base body 27 and the tilted position as shown in FIG. 6 in which they are rotated in the same direction to bring them closer to the seat base body 27.

The seat legs 28 and 29 are fixable to and detachable from the seat base body 27 in the normal position. Furthermore, the seat legs 28 and 29 are fixed to the seat base body 27 in the normal position, and are mounted on the vehicle floor F.

It should be noted that the following explanation refer to the case in which the central seat 17 is in normal position and is mounted on the vehicle floor F, unless otherwise mentioned.

Figure 5:
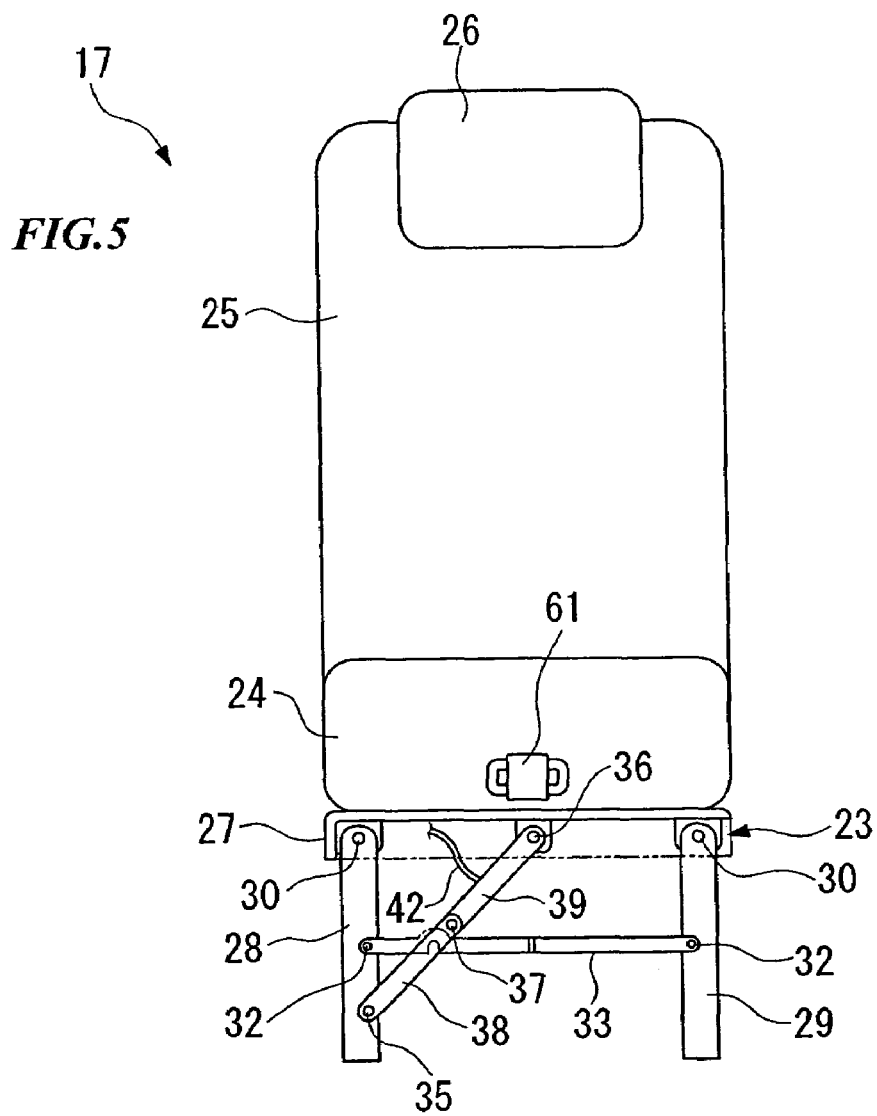
FIG. 5 is a front view of the central seat.
Figure 6:
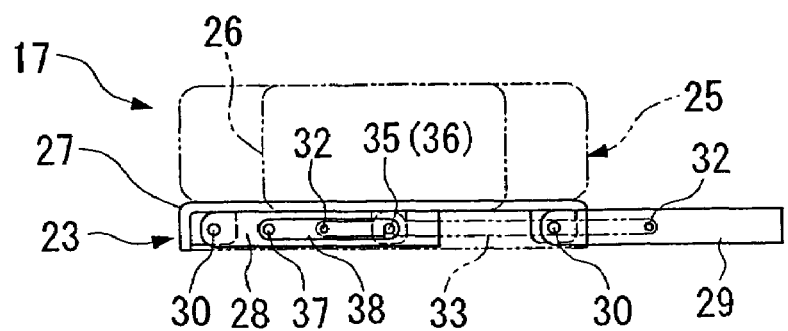
FIG. 6 is a front view of the central seat, shown with a seat cushion removed, a backrest rotated forwards, and seat legs rotated.

As shown in FIG. 5, a rotation shaft 30 is provided at both left and right sides of the seat base 23 to extend forwards and backwards, and the seat legs 28 and 29 are rotatably supported at their upper end on the relevant rotation shaft 30. The seat legs 28 and 29 are each provided at a middle portion thereof, at the same height, with a rotation shaft 32 having its axis extending forwards and backwards, and a left-and-right extending connection link 33 is rotatably linked to the rotation shafts 32.

In addition, a rotation shaft 35 having an axis extending forwards and backwards is provided at a lower side of the seat base 27 below the rotation shaft 32 of the seat leg 28, while a rotation axis 36 having an axis extending forwards and backwards is provided at a lower side of the center in the left and right direction of the seat base body 27. A pair of foldable links 38 and 39, which are rotatably linked to each other via a rotation shaft 37 having an axis extending forwards and backwards, are rotatably linked to the rotation shafts 35 and 36, respectively, so as to connect the rotation shafts 35 and 36.

Figure 7A:
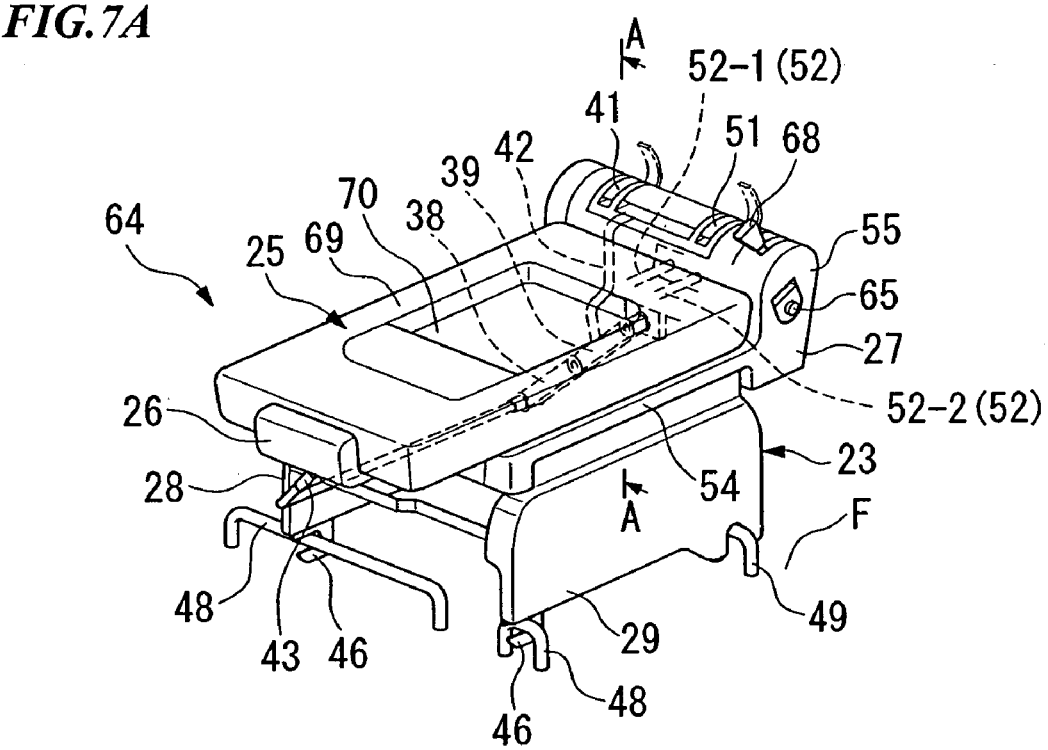
FIG. 7A is a perspective view of the central seat, shown with the seat cushion removed and the backrest rotated forwards.

When the central seat 17 is removed from the vehicle floor F and when the seat legs 28 and 29 are in the normal position, if one foldable link 39 is pulled via a cable 42 by manually pulling a posterior folding lever 41 (first operation element) provided, as shown in FIG. 7A, on a rear surface of the seat base body 27, the pair of foldable links 38 and 39 are folded centering around the rotation shaft 37. As a result, the distance between the rotation shaft 35 and the rotation shaft 36 is shortened such that the right-side seat leg 28 rotates in the direction approaching the seat base body 27 to become folded, and likewise the left-side seat leg 29 is rotated, via the connection link 33, in the same direction to become folded as shown in FIG. 6. As shown in FIG. 7A, the rotation shaft 35 is a rear end portion of an anterior folding lever 43 that extends forwards along an inner side of the seat leg 28, and the foldable links 38 and 39 can be folded by pulling the anterior folding lever 43 to rotate the foldable link 38.

Figure 9:
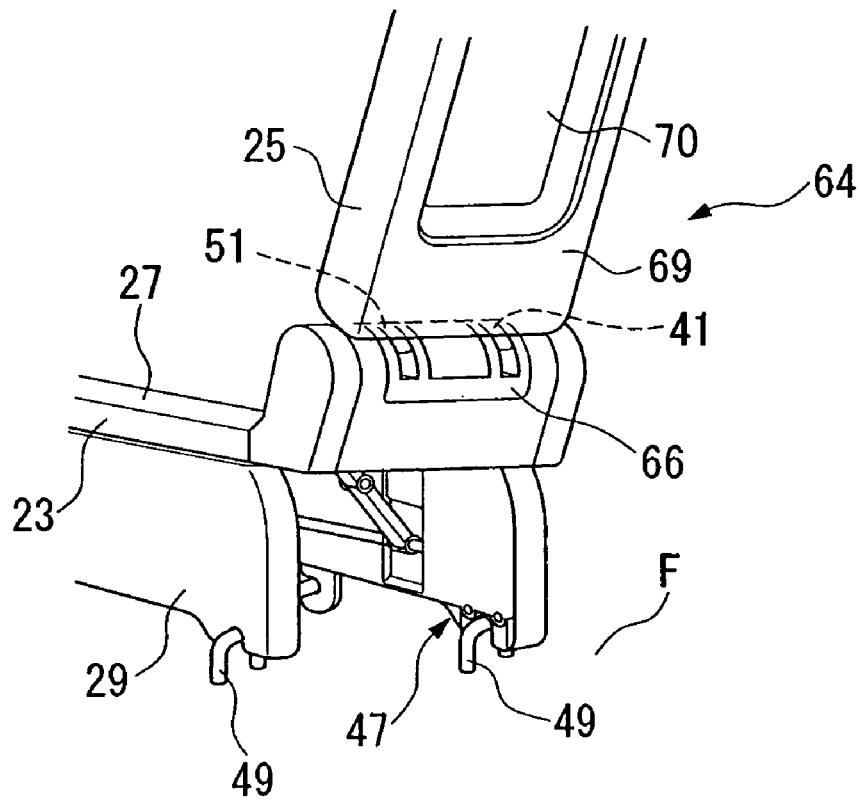
FIG. 9 is a perspective view of the central seat viewed from a rear side.

As shown in FIG. 4, each of the seat legs 28 and 29 is provided, at opposite sides of the rotation shaft 30, with a hook 46 and a locking mechanism 47, such that the hook 46 can be locked to an anterior locking portion 48 fixed to the vehicle floor F, and such that the locking mechanism 47 can couple with and decouple from a respective posterior locking portion 49 fixed to the vehicle floor F. By locking the hook 46 to the anterior locking portion 48 and by pressing the locking mechanism 47 against the relevant posterior locking portion 49 from above until it locks therewith, the central seat 17 can be fixed to the vehicle floor F. Each locking mechanism 47 can be released from the posterior locking portion 49 by manually pulling a disconnection lever (second operation element) 51 provided, as shown in FIGS. 4 and 9, on the rear side of the seat base body 27 and actuating each locking mechanism 47 via a cable 52. With the locking mechanisms 47 released, the central seat 17 is fully removable from the vehicle floor F. The cable 52 includes a right-side cable 52-1 and a left-side cable 52-2.

As shown in FIG. 7A, the posterior folding lever 41 and the disconnection lever 51 are provided on a seat back support 55 of the seat base 23. Specifically, the posterior folding lever 41 and disconnection lever 51 are provided within a storage area located on the middle side of the seat back support 55 in the car width direction, and, as shown in FIG. 4, under the backrest 25 and at the rear side of the seat cushion 24, and is hidden from an occupant sitting on the central seat 17.

Figure 7B:
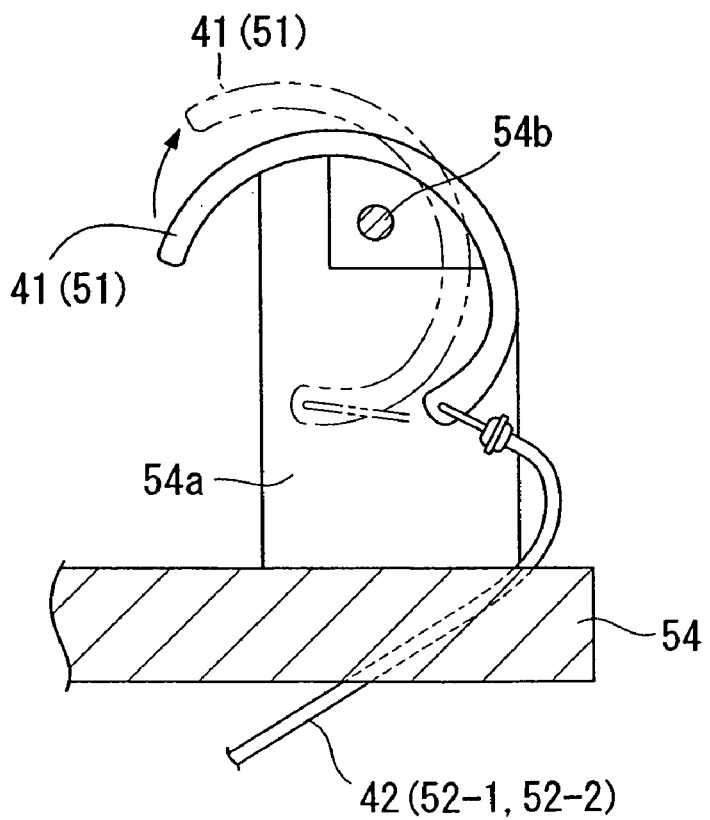
FIG. 7B is a cross-sectional view taken along the line A-A in FIG. 7A.

As shown in FIG. 7B, the posterior folding lever 41 is an arc-shaped member which is rotatably supported on a base part 54 by a pin 54b via a bracket 54a, and the cable 42 is connected to a bottom end of the posterior folding lever 41. Accordingly, by pulling a tip end of the posterior folding lever 41 upward, the posterior folding lever 41 rotates around the pin 54b and the bottom end thereof pulls the cable 42. Moreover, an explanation of the disconnection lever 51 is omitted here since it has the same configuration as the posterior folding lever 41 except that the posterior folding lever 41 is joined to the two cables 52-1 and 52-2.

Figure 8:
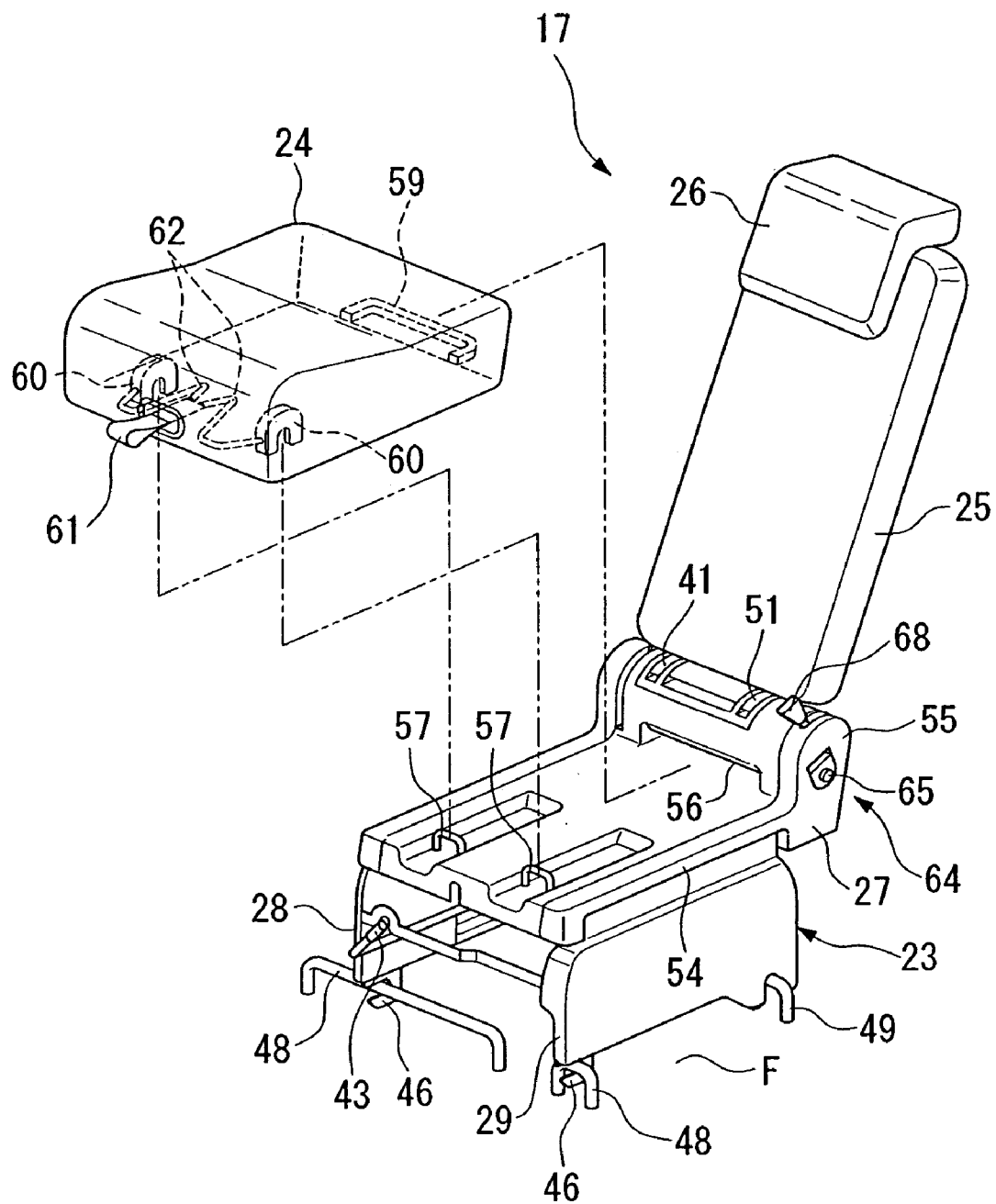
FIG. 8 is a perspective view of the central seat with the seat cushion removed.

As shown in FIG. 8, the seat cushion 24 is detachably provided on the seat base body 27. The seat base body 27 has a substantially planar base portion 54, and the seat back support 55 that projects upwards in a convex shape at a rear portion of the base portion 54 and supports the seat back 21. An engagement recess 56 indented backwards is formed at a front lower side of the seat back support 55. In addition, a locking portion 57 is provided at two positions, the left position and the right position, at a front side of the upper surface of the base portion 54.

In correspondence with the above, the seat cushion 24 is provided with a backward-projecting engagement hook 59 at a rear and lower end of the seat cushion 24, and two locking mechanisms (i.e., a left locking mechanism 60 and a right locking mechanism 60) at a front side of a lower surface of the seat cushion 24. When the engagement hook 59 of the seat cushion 24 is inserted into the engagement recess 56 of the seat base body 27, the locking mechanisms 60 can couple with and decouple from the locking portions 57 of the seat base body 27. That is, when the engagement hook 59 is inserted into the engagement recess 56, if the locking mechanisms 60 are pressed against the locking portions 57 from above, then the locking mechanisms 60 couple with the locking portions 57 and the seat cushion 24 is fixed to the seat base body 27. The locking mechanisms 60 can be released from the locking portions 57 by manually pulling a lock release strap 61 projecting at the front side of the seat base body 27 and actuating the locking mechanisms 60 via cables 62. By releasing the locking mechanisms 60, the seat cushion 24 is removed from the seat base 23. The central seat 17 with the seat cushion 24 removed therefrom and including only the seat base 23 and the backrest 25 will be hereinafter referred to as a cushion-detached body 64.

A rotation shaft 65 extends left and right in the seat back support 55 of the seat base body 27, and the backrest 25 is rotatably supported at one end thereof on the rotation shaft 65.

Figure 10:
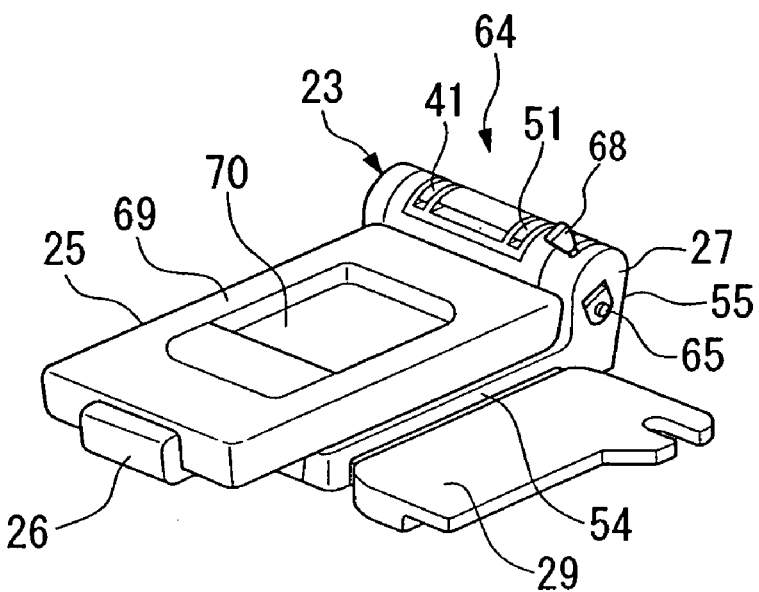
FIG. 10 is a perspective view of the central seat shown with the seat cushion removed, the backrest rotated forwards, and the seat legs rotated.
Figure 11:
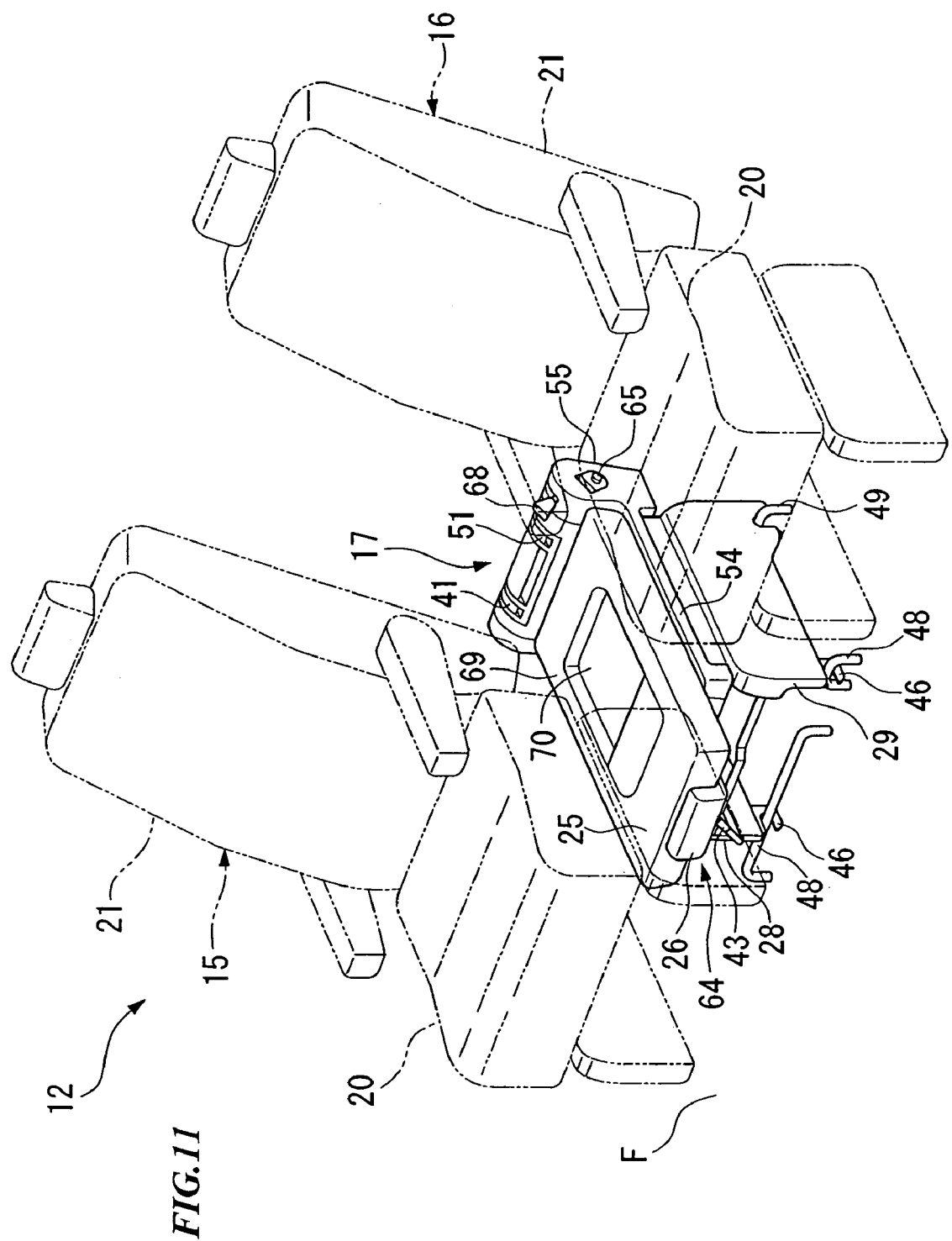
FIG. 11 is a perspective view of the second row of seats including the central seat, shown with the seat cushion of the central seat removed and the backrest rotated forwards.

The backrest 25 is rotatable between an erected position as seen in FIGS. 4, 8 and 9 in which it stands upright from the seat base 23 and a forward-folded position as shown in FIGS. 7A, 10 and 11 in which the seat cushion 20 has been removed and the backrest 25 is in contact with the base portion 54 of the seat base 23. The rotation shaft 65 is located at a height from the base portion 54 lower than that of the seat surface (upper surface) of the seat cushion 24 when mounted on the seat base 23. Therefore, when the backrest 25 is in the forward-folded position, the backrest 25 makes contact with substantially the entire surface of the base portion 54 of the seat base 23 from which the seat cushion 24 has been removed. That is, the backrest 25 is rotatable with respect to the seat base 23. The height of the backrest 25 from the base portion 54 in this forward-folded position is equal to or less than the height of the seat cushion 24 from the base portion 54 when the seat cushion 24 is mounted in place. At the rear portion of the seat back support 55, a grip 66 (FIG. 9) is provided for holding it when carrying the cushion-detached body 64.

The backrest 25 can be fixed at a plurality of angular positions to the seat base body 27 in the above erected position; i.e., its reclining angle can be adjusted, and the backrest 25 is normally urged in the direction of the forward-folded position with a spring (not shown).

When the backrest 25 is fixed in the erected position to the seat base body 27, and when an occupant is seated, if a recliner-operating lever 68 located at a lateral upper side of the seat back support 55 is manually pulled, the backrest 25 is disengaged from the seat base body 27 such that the reclining angle is adjustable so as to conform to the occupant's posture.

Furthermore, when the backrest 25 is fixed in the erected position to the seat base body 27 and when an occupant is not seated, if the recliner-operating lever 68 located at a lateral upper side of the seat back support 55 is manually pulled, the backrest 25 is disengaged from the seat base body 27 such that it is folded forwards by the urging force of the spring (not shown) into the forward-folded position where it lies on the base portion 54 when the seat cushion 24 has been removed.

A recessed tray 70 is provided on a back 69 of the backrest 25. In addition, the headrest 26 of the backrest 25 is set such that it does not protrude beyond the back 69 of the backrest 25 in a direction perpendicular to the back 69.

The central seat 17, when an occupant sits down, is secured to the vehicle floor F via the seat legs 28 and 29 in the normal position as shown in FIG. 4, and the backrest 25 is put in the erected position.

When the central seat 17 is not in use, for example, the seat cushion 24 is removed from the seat base 23 as shown in FIG. 8 by pulling the lock release strap 61, and in the remaining cushion-detached body 64, the recliner-operating lever 68 is pulled such that the backrest 25 is disposed in the forward-folded position, and the tray 70 provided on the back 69 of the backrest 25, as shown in FIG. 11, faces upwards and becomes usable. Then, occupants on the lateral seats 15 and 16 in the second row of seats 12 can use the tray 70 to place things thereon or the like.

For example, in order to provide a walk-through for occupants between the first row seats 11 or the second row seats 12 and the third row of seats 13 by providing a passage between the lateral seats 15 and 16 in the second row of seats 12 by removing the central seat 17, for example, the disconnection lever 51 shown in FIG. 9 is pulled to decouple the seat legs 28 and 29 from the vehicle floor F and allow the central seat 17 to be removed from the vehicle floor F. Thus, a passage is formed between the lateral seats 15 and 16.

Figure 12:
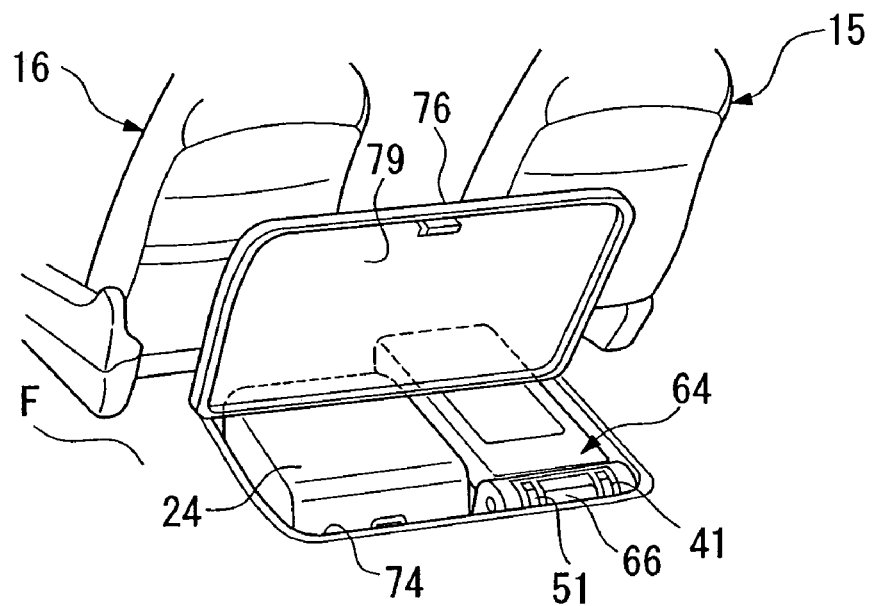
FIG. 12 is a perspective view of the central seat stored in a recessed portion and viewed from a rear side.

Then, the removed central seat 17 can be separated into the seat cushion 24 and the cushion-detached body 64 as shown in FIG. 8, by pulling the lock release strap 61 and removing the seat cushion 24 from the seat base 23. In the cushion-detached body 64, the recliner-operating lever 68 is pulled to allow the backrest 25 to fall forwards to the seat base 23 and into the folded position, and the anterior folding lever 43 or the posterior folding lever 41 is pulled to fold the seat legs 28 and 29 relative to the seat base body 27 (FIG. 6). Thereafter, as shown in FIG. 12, the seat cushion 24 and the seat base 23 with the backrest 25 folded (i.e., the cushion-detached body 64) are stored in a juxtaposed manner in a recess 74 provided in the vehicle floor F. Moreover, in the case in which the tray 70 is used and the central seat 17 must be left between the lateral seats 15 and 16, only the seat cushion 24 is stored in the recess 74.

Next, the recess 74 will be described.

As shown in FIG. 1, at a location on the vehicle floor F, positioned between the first row of seats 11 and the second row of seats 12, and further positioned at the center in the left and right direction, the recess 74, which has a substantially rectangular shape in top view, is formed below the surface of the vehicle floor F. The recess 74 is longer in the left and right direction than in the forwards and backwards direction.

A floor lid 76 is attached to an upper opening 75 of the recess 74 such that upper opening 75 can be closed or opened. The floor lid 76 can cover the entire area of the upper opening 75 of the recess 74. The floor lid 76 includes a front plate 78 that covers an entire front portion in the left and right direction of the upper opening 75 of the recess 74, and a rear plate 79 rockably linked to the rear end of the front plate 78 and extending backwards.

The front plate 78 of the floor lid 76 is rigidly fixed to the vehicle floor F and always covers the front portion of the upper opening 75 of the recess 74.

The rear plate 79 of the floor lid 76 is linked to the rear end of the front plate 78 such that the rear plate 79 is rockable upwards with respect to the front plate 78 fixed to the vehicle floor F. The rear plate 79 is provided at the side opposite the front plate 78 with left and right grips 80 that are held when opening and closing the rear plate 79.

The seat cushion 24 is removed, as mentioned above, from the central seat 17 removed from the vehicle floor F by pulling the lock release strap 61. Thereafter, in the cushion-detached body 64, the recliner-operating lever 68 is pulled to put the backrest 25 into the forward-folded position, and the anterior folding lever 43 or the posterior folding lever 41 is pulled to rotate the seat legs 28 and 29 with respect to the seat base body 27 into the folded position (FIG. 10). By folding the cushion-detached body 64 as mentioned above, the height thereof from the seat legs 28 and 29 to the backrest 25 in the thickness direction of the cushion-detached body 64 can be reduced.

As shown in FIG. 12, with the rear plate 79 of the floor lid 76 kept at an upward-rotated position to open the rear side of the upper opening 75 of the recess 74, the folded cushion-detached body 64 is held at the grip 66 and inserted, with the side opposite the grip 66 first, into the recess 74. The seat cushion 24 is also inserted into the recess 74 so as to be juxtaposed by the cushion-detached body 64 in the left and right direction.

Figure 13:
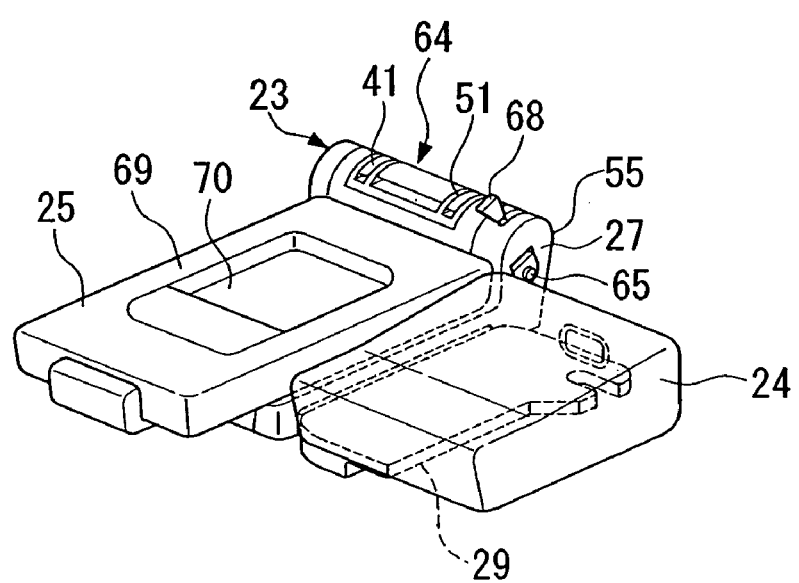
FIG. 13 is a perspective view of the central seat stored in the recessed portion.

At this time, the cushion-detached body 64 is stored with its thickness direction directed in the vertical direction, and likewise the seat cushion 24, which is juxtaposed with the cushion-detached body 64, is also stored with its thickness direction directed in the vertical direction. Furthermore, as shown in FIG. 13, the cushion-detached body 64 and the seat cushion 24 are stored with their lengthwise directions disposed parallel to each other, i.e., disposed in the forwards and backwards direction. In addition, at this time, the seat cushion 24 disposed on the seat leg 29 extending laterally outwards from the seat base 23 of the cushion-detached body 64, and in this condition, the seat cushion 24 and the cushion-detached body 64 have substantially the same height and are fully stored in the recess 74.

Then, after accommodating the seat cushion 24 and the cushion-detached body 64 into the recess 74, the rear plate 79 of the floor lid 76 is rotated downwards so as to fully close the upper opening 75 of the recess 74 as shown in FIG. 2.

As described above, according to the present embodiment, after removal of the central seat 17 from the vehicle floor F, the seat cushion 24 detachably mounted on the seat base 23 is removed therefrom to provide the cushion-detached body 64, the backrest 25 is folded to the seat base 23, and the foldable seat legs 28 and 29 are folded at the underside of the seat base 23 such that the cushion-detached body 64 has a thickness substantially reduced by an amount corresponding to the thicknesses of the seat legs 28 and 29 and the seat cushion 24. The cushion-detached body 64 and the removed seat cushion 24 are then accommodated in a juxtaposed manner in the recess 74 provided in the vehicle floor F which is limited in height. Thus, the central seat 17, when not in use, may be removed from the vehicle floor F and be efficiently stored inside the vehicle. Moreover, efficient storing inside the vehicle is likewise possible in the case in which the foldable seat legs 28 and 29 are eliminated from the underside of the seat base 23 and the seat cushion 24 is made thicker to allow that.

In addition, since the posterior folding lever 41 for releasing a fixation of the seat legs 28 and 29 and the disconnection lever 51 for releasing locking of the locking mechanisms 47 are provided at the seat back support 55 of the seat base 23, the posterior folding lever 41 and the disconnection lever 51 can be prevented from being operated. Thus, any inconvenience to an occupant sitting on the center seat 17 due to the seat legs 28 and 29 being unwillingly folded can be prevented.

In particular, since the posterior folding lever 41 and disconnection lever 51 are provided within the above-mentioned storage area on the seat back support 55 of the seat base 23, undesirable operation of the posterior folding lever 41 and disconnection lever 51 is impossible; and thereby, the reliability at preventing misoperation can be increased. As mentioned above, preventing misoperation can be achieved by a simple configuration without providing additional locking mechanisms. Furthermore, since the posterior folding lever 41 and disconnection lever 51 can be disposed closer to each other in a compact manner, a more beneficial layout thereof can be achieved.

Furthermore, the seat cushion 24, and the seat base 23 with the backrest 25 folded and the seat legs 28 and 29 folded (i.e., the cushion-detached body 64) are juxtaposed with their thickness directions directed in the vertical direction so as to be stored in the recess 74 provided in the vehicle floor F that is limited in height. Thus, the removed central seat 17 may further be efficiently stored inside the vehicle.

In addition, with the seat cushion 24 mounted on the seat base 23, because the rotation shaft 65 of the backrest 25 is located at the seat legs 28 and 29 side and at a lower side with respect to the bearing surface of the seat cushion 24, the total thickness of the seat base 23 with the seat cushion 24 removed therefrom and the backrest 25 folded on the seat base 23 (i.e., the thickness of the cushion-detached body 64) can be made thinner. Thus, the removed central seat 17 may further be efficiently stored inside the vehicle.

In addition, because the pair of seat legs 28 and 29 are rotated in the same direction to be folded, they can be folded without interference with each other, irrespective of their length. Thus, the removed central seat 17 may further be efficiently stored inside the vehicle.

Furthermore, because the tray 70 is provided on the back 69 of the backrest 25, with the central seat 17 maintained on the vehicle floor F, if the seat cushion 24 is removed from the seat base 23 and the backrest 25 is folded on the seat base 23, the tray 70 on the back 69 of the backrest 25 faces upwards and is adapted for use. Because the seat cushion 24 is thus removed before the backrest 25 is folded, the backrest 25 and the tray 70 become stable, allowing items to be reliably placed on the tray 70.

Figure 14:
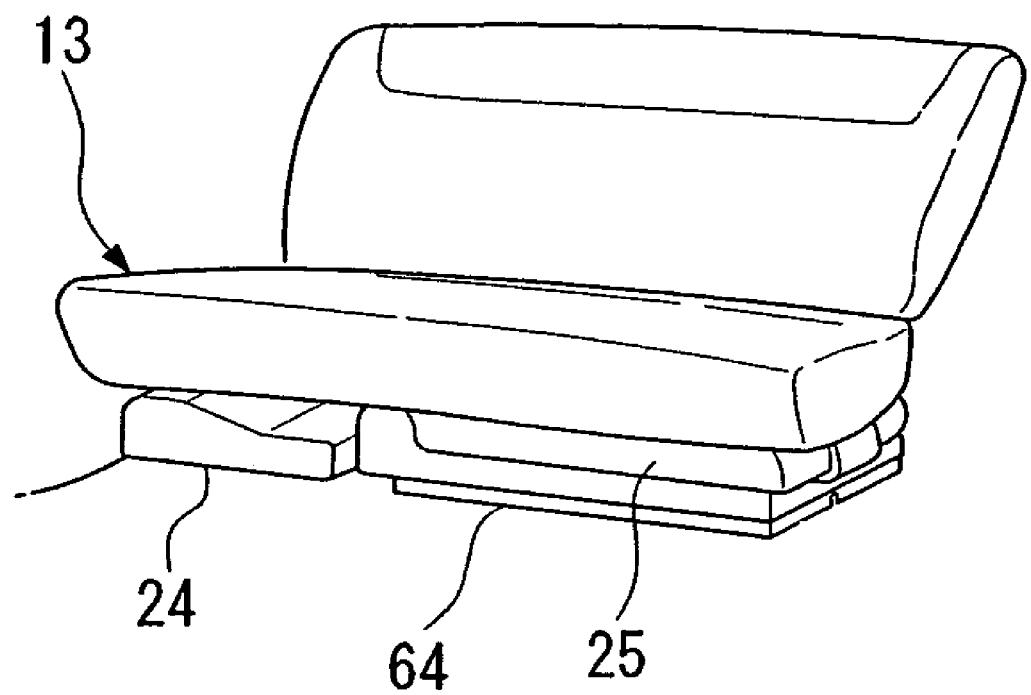
FIG. 14 is a perspective view of the central seat stored under another seat.

As mentioned above, after removal of the central seat 17 from the vehicle floor F, the seat cushion 24 is removed to provide the cushion-detached body 64, the backrest 25 is allowed to fall forwards to be folded, and the seat legs 28 and 29 are rotated relative to the seat base body 27 into the folded position. Thereafter, it is also possible, as shown in FIG. 14, to store the cushion-detached body 64 and the seat cushion 24 in a juxtaposed manner under the third seat 13, i.e., between the third seat 13 and the vehicle floor F.

Also in this case, the cushion-detached body 64 is stored with its thickness direction directed in the vertical direction, and likewise the seat cushion 24 that is juxtaposed beside the cushion-detached body 64 is stored with its thickness direction directed in the vertical direction. In addition, the cushion-detached body 64 and the seat cushion 24 are stored with their lengthwise directions directed in the same direction, i.e., in the left and right direction.

In this way, the cushion-detached body 64 and the seat cushion 24 may be stored in the area under the third seat 13 that cannot have a large height, making it possible for the removed central seat 17 to be efficiently stored inside a vehicle as previously mentioned in this embodiment.

Here, in the case of storing under the seat, it is also possible to rotate and fold the seat legs 28 and 29 of the seat base 23 in the opposite directions such that their front ends come closer to each other.

Second Embodiment

A second embodiment of the present invention will be described with reference to FIGS. 15 to 18. In the following explanation, different featured to those in the first embodiment will be mainly explained. Moreover, for the same part or the same element as is in the first embodiment, the same reference symbols will be applied thereto and the explanation thereof will be omitted.

In the second embodiment, either one of the lateral seats 15 and 16 in the second row of seats 12, disposed on both sides of the central seat 17 in a width direction of the vehicle, more specifically, the right-side lateral seat 15 in the present embodiment, is made changeable with respect to its position in the width direction of the vehicle.

At the positions of the vehicle floor F corresponding to the lateral seat 15 and the central seat 17, two anterior locking elements 100 and 101 are respectively provided which are shaped like a bent rod and which are at the same position in the forwards and backwards direction and are slightly spaced from each other in the width direction of the vehicle. Each of the anterior locking elements 100 and 101 has both ends protruding from the vehicle floor F and an intermediate portion extending long in the width direction of the vehicle to connect both ends of the locking element. In addition, on the backward side of these anterior locking elements 100 and 101, five posterior locking elements 102 to 106 are provided which are at the same position in the forwards and backwards direction and spaced from one another in the width direction of the vehicle. Each of the locking elements 102 to 106 has both ends rising from the vehicle floor F and an intermediate portion extending shortly in the width direction of the vehicle to connect both ends of the locking element.

The lateral seat 15 has a pair of seat legs 110 and 111 extending downwards from the right and left sides of the seat cushion 20 and is secured at the seat legs 110 and 111 to the vehicle floor F.

The seat leg 110 of the lateral seat 15 is provided, at a front portion thereof, with a hook 112 engageable with the anterior locking element 100 and, at a rear portion, with a locking mechanism 113 releasably coupleable with the posterior locking elements 102 or 103. The seat leg 110 of the lateral seat 15 is fixed to the vehicle floor F. with its hook 112 locked with the anterior locking element 100, by pressing the locking mechanism 113 against the posterior locking element 102 or the posterior locking element 103 from above into coupling therewith. The locking mechanism 113 is releasable from the coupling with the posterior locking element 102 or the posterior locking element 103 by manually pulling a disconnection lever (not shown).

The seat leg 111 of the lateral seat 15 is provided, at a front portion thereof, with a hook 114 engageable with the anterior locking element 101 and, at a rear portion, with a locking mechanism 115 releasably coupleable with the posterior locking element 104 or 106. The seat leg 111 of the lateral seat 15 is fixed to the vehicle floor F, with its hook 114 locked with the anterior locking element 101, by pressing the locking mechanism 115 against the posterior locking element 104 or the posterior locking element 106 from above into coupling therewith. The locking mechanism 115 is releasable from the coupling with posterior locking element 104 or the posterior locking element 106 by manually pulling a disconnection lever (not shown).

Figure 15:
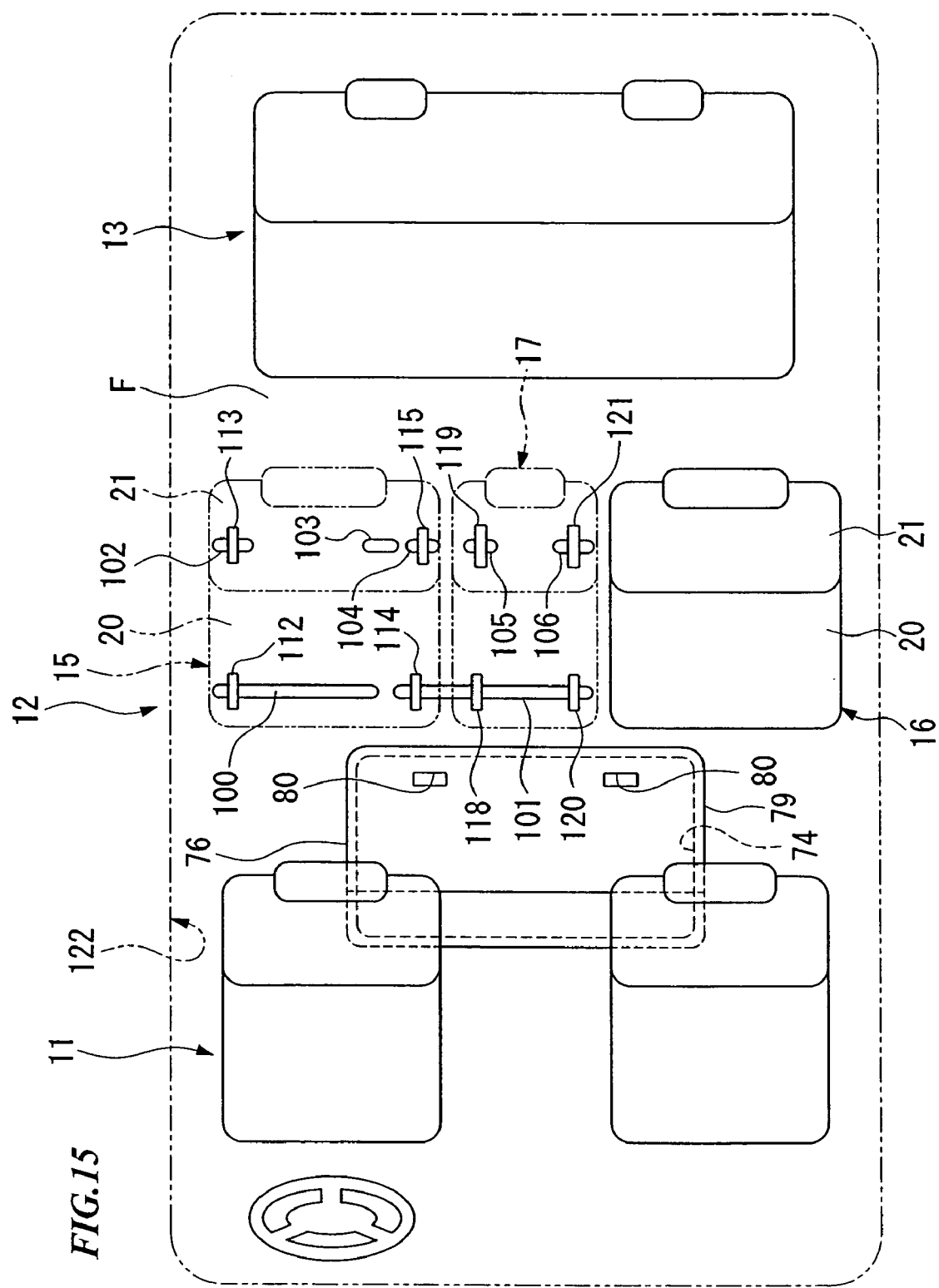
FIG. 15 is a plan view of a vehicle interior, shown with a right-side lateral seat in a spaced fixed position and the central seat mounted.
Figure 17:
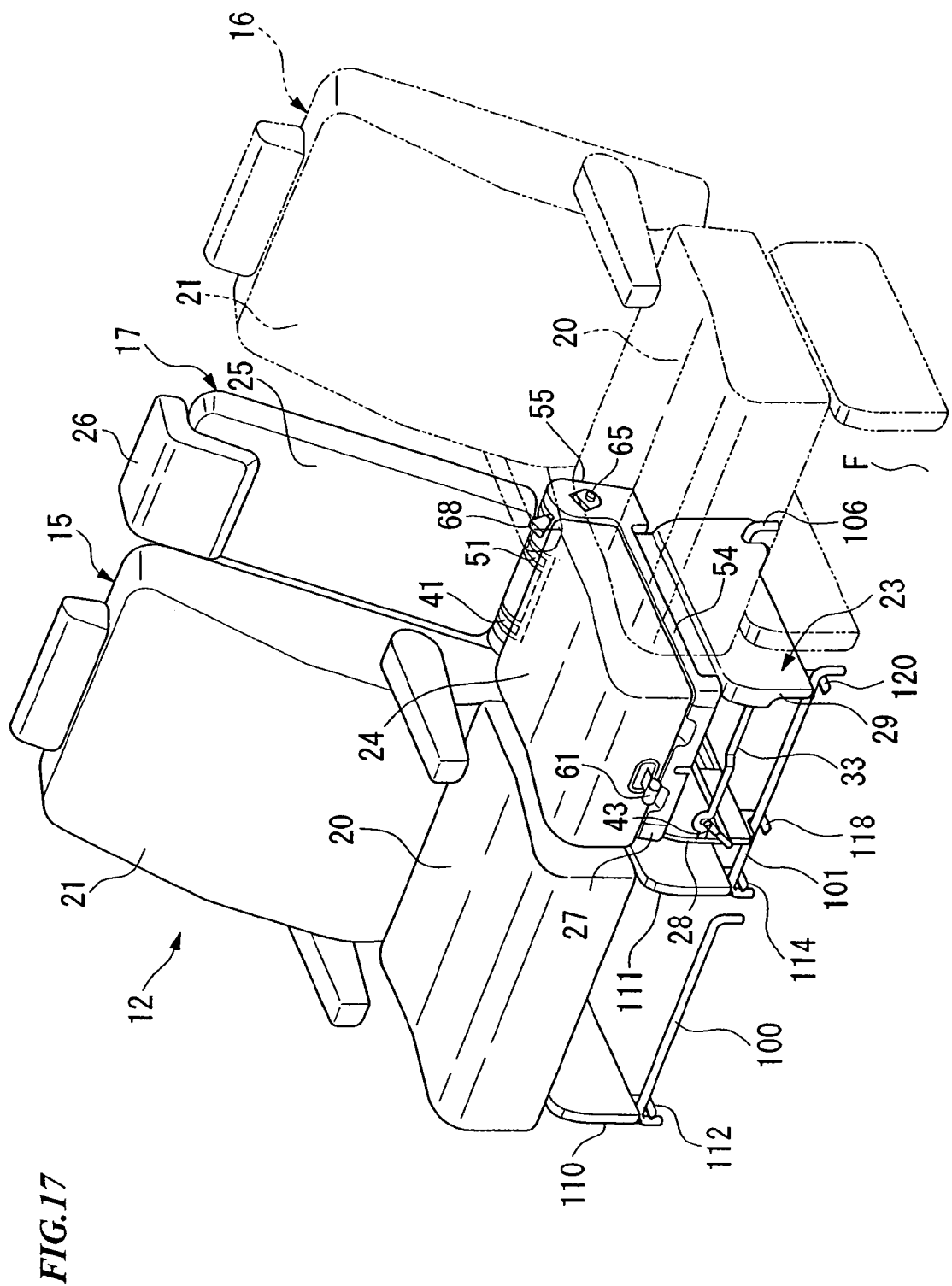
FIG. 17 is a perspective view of the second row of seats including the central seat, shown with the right-side lateral seat in the spaced fixed position and the central seat mounted.

If, with the right-side seat leg hook 112 locked with a right end portion of the right-side anterior locking element 100 fixed to the vehicle floor F and with the left-side seat leg hook 114 locked with a right end portion of the left-side anterior locking element 101 fixed to the vehicle floor F, the right-side seat leg locking mechanism 113 couples with the right end posterior locking element 102 fixed to the vehicle floor F and the left-side seat leg locking mechanism 115 couples with the third posterior locking element 104 from the right fixed to the vehicle floor F as shown in FIGS. 15 and 17, the lateral seat 15 is fixed to the vehicle floor F in a spaced position from the left-side lateral seat 16. This position will be referred to as a spaced fixed position hereinafter.

The central seat 17 has the same structure as in the first embodiment and has the seat cushion 24 and the pair of seat legs 28 and 29 extending downwards from the right and left sides of the seat cushion 24. The seat leg 28 is provided, at a front portion, with a hook 118 engageable with the anterior locking element 101 and, at a rear portion, with a locking mechanism 119 releasably coupleable with the posterior locking element 105. The seat leg 29 of the central seat 15 is provided, at a front portion, with a hook 120 engageable with the anterior locking element 101 and, at a rear portion, with a locking mechanism 121 releasably coupleable with the posterior locking element 106. Moreover, although the reference numerals used in the present embodiment for designating the central seat anterior locking elements 118 and 120 and locking mechanisms 119 and 121 are different from those used in the first embodiment, they are the same in structure. In the present embodiment, the posterior folding lever 41 and disconnection lever 51 each having the same configuration as in the first embodiment are provided at the seat back support 55 of the seat base 23 (refer to FIG. 17).

When the lateral seat 15 is in the spaced fixed position as mentioned above, the central seat 17 is disposed between the lateral seat 15 and the lateral seat 16 so as to be fixed to the vehicle floor F. In other words, with the right-side seat leg hook 118 locked with the left-side anterior locking element 101 fixed to the vehicle floor F, at a position leftward of the position where the hook 114 of the lateral seat 15 locks with the locking element 101, and with the left-side seat leg hook 120 locked with the left-side anterior locking element 101 at a left end position, the right-side seat leg locking mechanism 119 is pressed against from above and couples with the fourth posterior locking element 105 from the right fixed to the vehicle floor F, and the left-side seat leg locking mechanism 121 is pressed against from above and couples with the fifth posterior locking element 106 from the right fixed to the vehicle floor F, so as to lock the central seat 17 to the vehicle floor F. In this state, three occupants may sit down on three seats, namely, the lateral seats 15 and 16 and the central seat 17.

Figure 16:
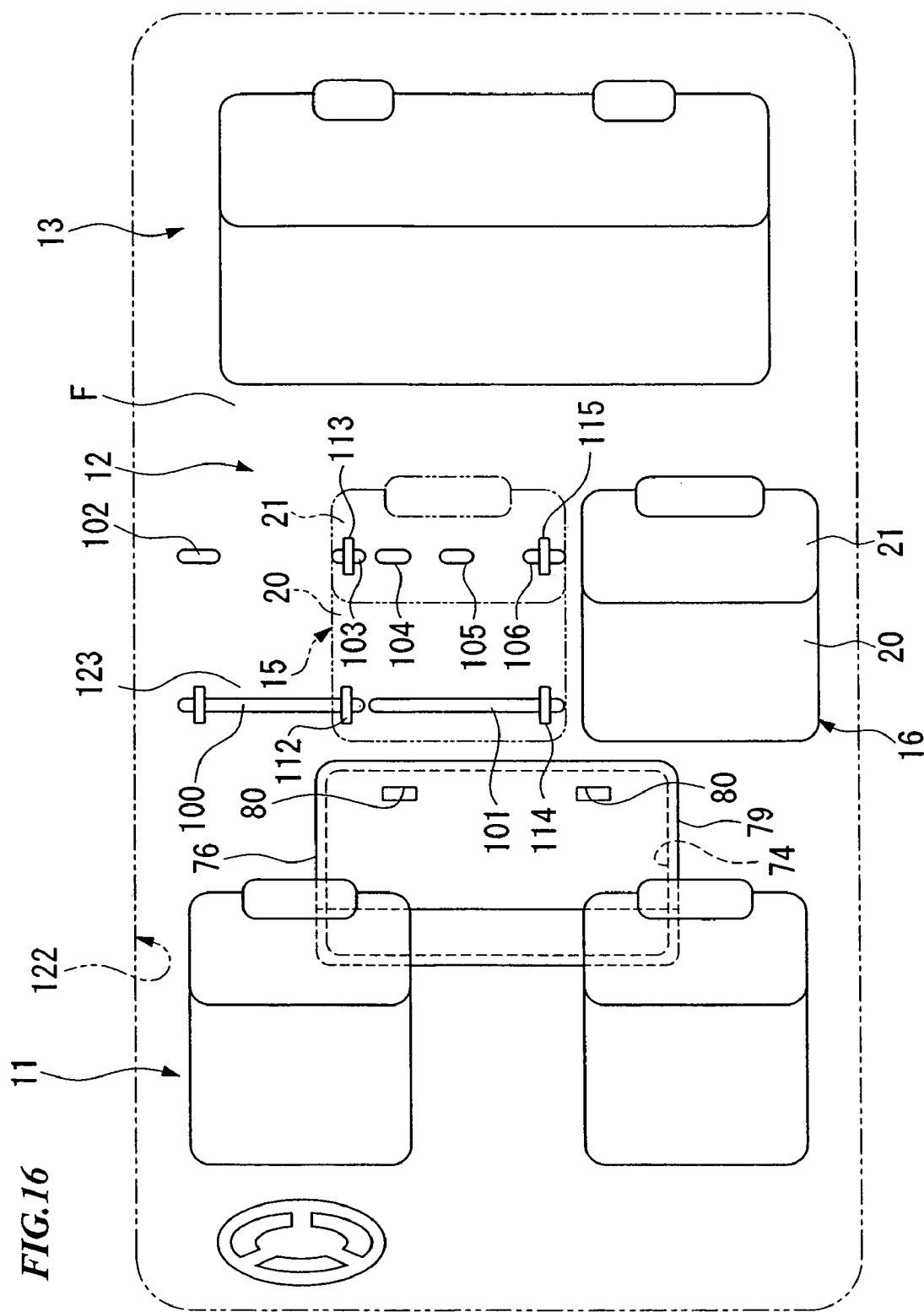
FIG. 16 is a plan view of the vehicle interior, shown with the central seat removed and the right-side lateral seat in a closer-moved fixed position.
Figure 18:
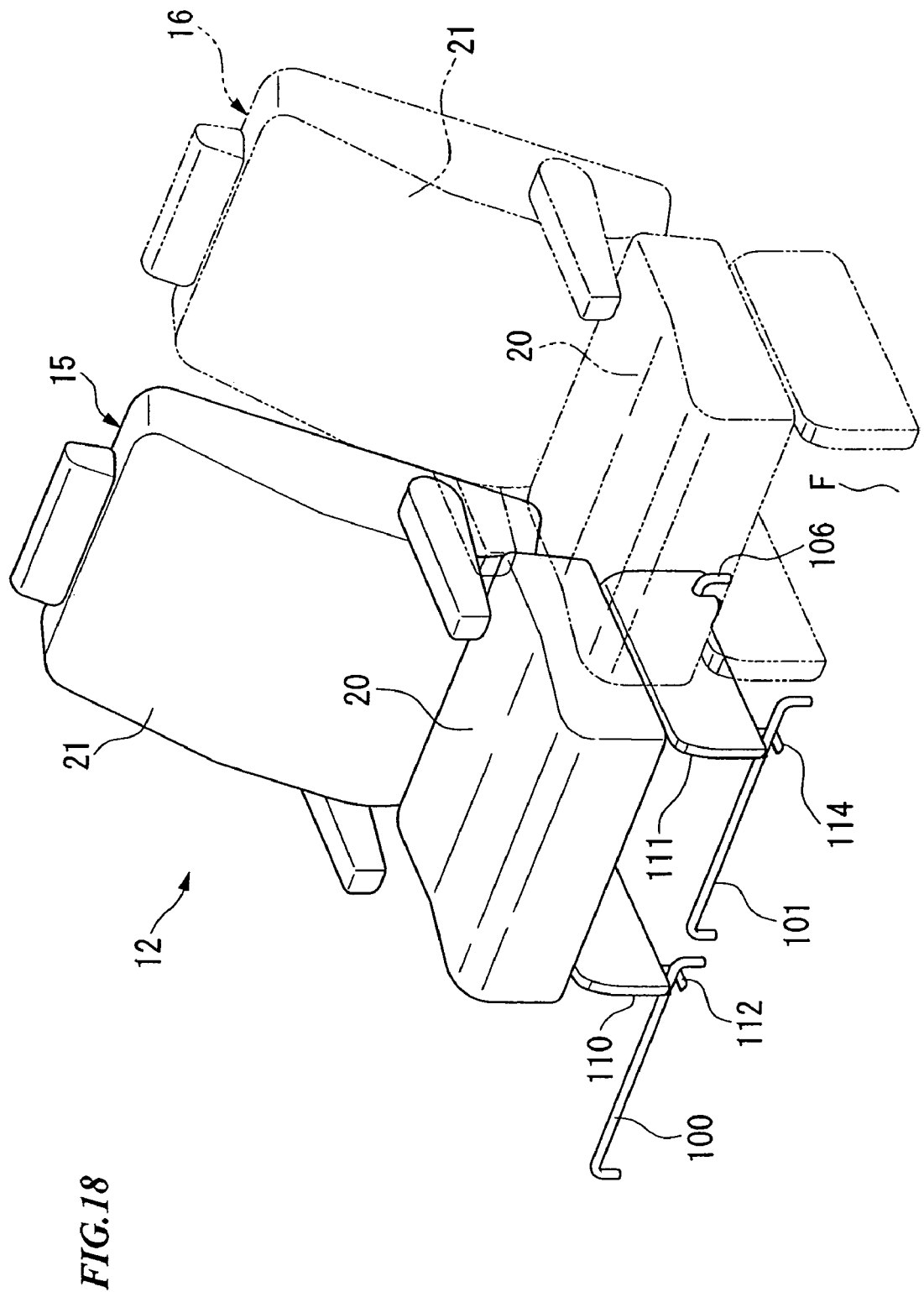
FIG. 18 is a perspective view of the second row of seats including the central seat, shown with the central seat removed and the right-side lateral seat in the closer-moved fixed position.

By unlocking the locking mechanisms 119 and 121, the central seat 17 is detached from the vehicle floor F and removed from between the lateral seats 15 and 16. If, after removal of the central seat 17, the right-side seat leg locking mechanism 113 of the lateral seat 15 is coupled with the second posterior locking element 103 from the right fixed to the vehicle floor F, and the left-side seat leg locking mechanism 115 is coupled with the fifth posterior locking element 106 from the right fixed to the vehicle floor F, with the right-side seat leg hook 112 locked with the right-side anterior locking element 100 fixed to the vehicle floor F, at a left end position thereof, and with the left-side seat leg hook 114 locked with the left-side anterior locking element 101 fixed to the vehicle floor F, at a left end position as shown in FIGS. 16 and 18, the lateral seat 15 is fixed to the vehicle floor F in a closer position to the left-side lateral seat 16. This position will be referred to as a closer-moved position hereinafter. In this state, two occupants may sit down on two seats, namely, the lateral seats 15 and 16. Moreover, as a result of the position change of the lateral seat 15 toward the lateral seat 16, a relatively large space 123 is secured on the side of the lateral seat 15 opposite the lateral seat 16 that allows a forwards and backwards walk-through of occupants inside the vehicle 22.

In order to move the lateral seat 15 between the spaced fixed position and the closer-moved position, the posterior locking mechanisms 113 and 115 are unlocked, and the lateral seat 15 is slightly raised at the rear. The hooks 112 and 114 are guided along the anterior locking elements 100 and 101, with the hooks 112 and 114 maintained locked with the anterior locking elements 100 and 101, so as to slide the lateral seat 15 in the width direction of the vehicle.

According to the present embodiment as described above, by locking one lateral seat 15 with the anterior locking elements 100 and 101 and with the posterior locking elements 102 and 104 in the spaced fixed position spaced apart from the other lateral seat 16, and by locking the central seat 17 with the anterior locking element 101 and with the posterior locking elements 105 and 106 and disposing the central seat 17 between the lateral seats 15 and 16 on both sides in the width direction of the vehicle, it becomes possible for three occupants to take their respective seats in this row. On the other hand, by detaching the central seat 17 from the anterior locking element 101 and the posterior locking elements 105 and 106, and by guiding the lateral seat 15 along the anterior locking elements 100 and 101 toward the lateral seat 16 and locking the lateral seat 15 with the locking elements 100 and 101 and with the posterior locking elements 103 and 106 in the closer-moved position, it becomes possible for two occupants to take their respective seats and for occupants to walk through the space 123 formed inside the vehicle cabin 122, on the side of the lateral seat 15 opposite the lateral seat 16. In addition, the central seat 17 is rockable with the anterior locking element 101 along which the lateral seat 15 is guided in the width direction of the vehicle and with which the lateral seat 15 locks to be put in position. Thus, the anterior locking element 101 serves the function of locking and guiding the lateral seat 15 as well as the function of locking the central seat 17, thereby leading to a reduction in the cost.

In addition, when the central seat is in use, since the posterior folding lever 41 and disconnection lever 51 each having the same configuration as in the first embodiment are provided at the seat back support 55 of the seat base 23, it is possible to prevent undesirable operations of the posterior folding lever 41 and disconnection lever 51. Thus, it is possible to prevent inconvenience to an occupant sitting on the center seat 17 due to the seat legs 28 and 29 being unwillingly folded.

That is, since the posterior folding lever 41 and disconnection lever 51 are provided within the above-mentioned storage area on the seat back support 55 of the seat base 23, when an occupant is sitting on the center seat 17, undesirable operation of the posterior folding lever 41 and disconnection lever 51 is impossible; and thereby, the reliability at preventing misoperation can be increased.

While in the present embodiment, a description has been made of the case where the right-side lateral seat 15 is changeable in position in the width direction of the vehicle, it is of course also possible to make the left-side lateral seat 16 changeable in position in the width direction of the vehicle.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A vehicle seat comprising:
   a seat base with two seat legs detachably mounted on a vehicle floor, the seat legs rotatably provided under the seat base;
   a seat cushion provided on the seat base;
   a backrest rotatably supported on the seat base via a backrest support member;
   a first operation element for releasing a fixation of the seat legs in the rotating direction; and
   a second operation element for releasing a fixation of the seat legs to the vehicle floor; wherein
   the first operation element and the second operation element are provided at the backrest support member.

2. The vehicle seat according to claim 1, wherein
   the first operation element and the second operation element are disposed within a storage area in the backrest support member.

* * * * *